US009047597B2

(12) United States Patent
Araki (10) Patent No.: US 9,047,597 B2
(45) Date of Patent: Jun. 2, 2015

(54) POS SYSTEM (75) Inventor: Takashi Araki, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 0 days.

(21) Appl. No.: 13/982,404

(22) PCT Filed: Oct. 4, 2011

(86) PCT No.: PCT/JP2011/073280
§ 371 (c)(1),
(2), (4) Date: Jul. 29, 2013

(87) PCT Pub. No.: WO2012/105090
PCT Pub. Date: Aug. 9, 2012

(65) Prior Publication Data
US 2013/0332295 A1 Dec. 12, 2013

(30) Foreign Application Priority Data
Jan. 31, 2011 (JP) ................................ 2011-018619

(51) Int. Cl.
G06Q 20/20 (2012.01)
G06Q 40/02 (2012.01)

(52) U.S. Cl.
CPC .............. G06Q 20/202 (2013.01); G06Q 40/02 (2013.01)

(58) Field of Classification Search
CPC ....... G06Q 40/02; G06Q 30/06; G06Q 20/20; G06Q 20/202; G06Q 20/40; G06Q 20/3278; G06Q 20/10; G06Q 20/12
USPC .......................................................... 705/21
See application file for complete search history.

(56) References Cited

U.S. PATENT DOCUMENTS 6,067,530 A * 5/2000 Brooks et al. .................. 705/30
2010/0235207 A1 9/2010 Asazuma

FOREIGN PATENT DOCUMENTS

| CN | 101833311 A | 9/2010 |
|---|---|---|
| JP | 2003-308375 A | 10/2003 |
| JP | 2005-216016 A | 8/2005 |
| JP | 2007-130331 A | 5/2007 |
| JP | 2009-282562 A | 12/2009 |

OTHER PUBLICATIONS

Oswald, Charles A. A Comparative Historical, Legal and Policy Analsyis of Informal and Formal Money Transfer Systems. Dissertation Presented to School of Law of Saint Thomas University. Dec. 2007.*
International Search Report for PCT/JP2011/073280, dated Dec. 27, 2011.
Communication dated Apr. 14, 2014, issued by the State Intellectual Property Office of the People's Republic of China in corresponding Application No. 201180066458.1.

* cited by examiner

Primary Examiner — Ryan Zeender
Assistant Examiner — Fawaad Haider
(74) Attorney, Agent, or Firm — Sughrue Mion, PLLC (57) ABSTRACT Provided is a POS system, including a terminal (12) that includes a bank deposit amount calculating unit (122) for calculating a bank deposit amount for each business day, in which the bank deposit amount calculating unit (122) subtracts an amount spent for other uses than as a change from a total amount of cash gained on a day that validity of the spending is judged and approved, to thereby calculate a bank deposit amount of the day. With this configuration, the management of cash such as a change fund in the POS system is clarified.

2 Claims, 7 Drawing Sheets

| SHOPPING MONEY SETTLEMENT ENTRY (RECEIPT IS TO BE SENT TO THE HEADQUARTERS) | 09/10/04 18:00 | FILLED OUT BY: TARO YAMADA | XX-X-XX ◇HELP |
|---|---|---|---|

STORE: 000001, TEST STORE
[SEND/REGISTER] [NEW ENTRY] [RETURN]   [CHECK ALL] [UNCHECK ALL]
ENTERED DATE: 09/10/04 (SUN.)
                                          [PREVIOUS PAGE] [NEXT PAGE]  [1/1]

| SEND | STATUS | REQUEST FORM NUMBER | ENTERED DATE | DATE ON RECEIPT | PAYMENT RECIPIENT | AMOUNT ON RECEIPT |
|---|---|---|---|---|---|---|
| ☐ | | | | | | YEN |
| ☐ | | | | | | YEN |
| ☐ | | | | | | YEN |
| ☐ | | | | | | YEN |
| ☐ | | | | | | YEN |
| ☐ | | | | | | YEN |
| ☐ | | | | | | YEN |
| | | | | | TOTAL OF AMOUNTS ON RECEIPTS | YEN |
| | | | | | | YEN |

| SHOPPING MONEY SETTLEMENT ENTRY (REGISTER/CORRECT) | | | 09/10/04 18:00 | | FILLED OUT BY: TARO YAMADA | ◇HELP XX-X-XX |
|---|---|---|---|---|---|---|
| STORE: 000001, TEST STORE | | | | | | |
| [ENTER] [RETURN] | | | | | | |
| ENTERED DATE: 09/10/04 (SUN.) | | | STATUS: UNREQUESTED | | REQUEST FORM NUMBER: 00000010910040011 | |
| DATE ON RECEIPT | 09/10/04 | | | | | |
| PAYMENT RECIPIENT | O×SUPERMARKET | | | | | |

| DELETE | SUMMARY | AMOUNT (INCLUDING TAX) | | CLASSIFICATION | TRANSPORTATION EXPENSE BREAKDOWN PURPOSE, ONE-WAY/ROUND TRIP, TRAVELED(FROM~TO) |
|---|---|---|---|---|---|
| ☐ | A CARTON OF EGGS | 200 | YEN | INGREDIENTS ▶ | — |
| ☐ | FIVE HEADS OF LETTUCE | 750 | YEN | INGREDIENTS ▶ | — |
| ☐ | A LIGHT BULB | 120 | YEN | CONSUMABLE SUPPLIES ▶ | — |
| ☐ | | | YEN | ▶ | — |
| ☐ | | | YEN | ▶ | — |
| ☐ | | | YEN | ▶ | — |
| ☐ | | | YEN | ▶ | — |
| ☐ | | | YEN | ▶ | — |
| ☐ | | | YEN | ▶ | — |
| ☐ | | | YEN | ▶ | — |
| AMOUNT ON RECEIPT | | 1,070 | YEN | | |

SHOPPING MONEY SETTLEMENT ENTRY(RECEIPT IS TO BE SENT TO THE HEADQUARTERS) | 09/10/04 18:00 | FILLED OUT BY: TARO YAMADA | XX-X-XX ◇HELP

STORE: 000001, TEST STORE
SEND/REGISTER | NEW ENTRY | RETURN

ENTERED DATE : 09/10/04 (SUN.)

CHECK ALL | UNCHECK ALL

| SEND | STATUS | REQUEST FORM NUMBER | ENTERED DATE | DATE ON RECEIPT | PAYMENT RECIPIENT | AMOUNT ON RECEIPT |
|---|---|---|---|---|---|---|
| ☑ | UNREQUESTED AND SCHEDULED TO BE SENT | 000000010910040001 | 09/10/04 TARO YAMADA | 09/10/04 | O × SUPERMARKET | 1,070 YEN |
| ☐ | | | | | | YEN |
| ☐ | | | | | | YEN |
| ☐ | | | | | | YEN |
| ☐ | | | | | | YEN |
| ☐ | | | | | | YEN |
| ☐ | | | | | | YEN |
| ☐ | | | | | | YEN |
| | | | | | TOTAL OF AMOUNTS ON RECEIPTS | 1,070 YEN |

PREVIOUS PAGE | NEXT PAGE | [1/1]

FIG. 5

SHOPPING MONEY CONFIRMATION SCREEN (REGISTER)

STORE: 000001, TEST STORE     09/10/06 18:00     FILLED OUT BY: TARO YAMADA     XX-X-XX

[ENTER] [RETURN]

ESTABLISHED DATE: 09/10/06 (TUE.)

◇ HELP

[CHECK ALL] [UNCHECK ALL]

| ESTAB-LISHED | STATUS | TRANSMISSION NUMBER | TRANSMITTED DATE | DECIDED DATE | AMOUNT ON RECEIPT / APPROVED AMOUNT | |
|---|---|---|---|---|---|---|
| ☑ | APPROVED | 0000001091001 | 09/10/01 TARO YAMADA | 09/10/04 JIRO SUZUKI | 1,670 | YEN |
| | | | | | 1,670 | YEN |
| ☑ | APPROVED | 0000001091004 | 09/10/04 TARO YAMADA | 09/10/05 JIRO SUZUKI | 1,070 | YEN |
| | | | | | 1,070 | YEN |
| ☐ | | | | | | YEN |
| | | | | | | YEN |
| ☐ | | | | | | YEN |
| | | | | | | YEN |
| ☐ | | | | | | YEN |
| | | | | | | YEN |
| ☐ | | | | | | YEN |
| | | | | | | YEN |
| ☐ | | | | | | YEN |
| | | | | | | YEN |
| ☐ | | | | | | YEN |
| | | | | | | YEN |

[PREVIOUS PAGE] [NEXT PAGE]    [1/1]

| POS SETTLEMENT CASH COUNT ||
|---|---|
| REGISTERED CHANGE | 47,630円 |
| CASH SALE | 180,097円 |
| RECEIVED MONEY | 0円 |
| PAYMENT | 3,000円 |
| CURRENT CASH AMOUNT | 224,727円 |
| BANK DEPOSIT AMOUNT ||
| CASH AMOUNT ON HAND | 47,630円 |
| CASH + RECEIVED MONEY | 180,097円 |
| SHOPPING REQUESTED | 3,000円 |
| SHOPPING UNREQUESTED | 0円 |
| SHOPPING APPROVED | 2,370円 |
| BANK DEPOSIT AMOUNT | 177,727円 |
| (SHOULD-BE) AMOUNT ON HAND | 47,000円 |

FIG. 7

POS SYSTEM

CROSS REFERENCE TO RELATED APPLICATIONS

This application is a National Stage of International Application No. PCT/JP2011/073280 filed Oct. 4, 2011, claiming priority based on Japanese Patent Application No. 2011-018619 filed Jan. 31, 2011, the contents of all of which are incorporated herein by reference in their entirety.

TECHNICAL FIELD

This invention relates to a point of sales (POS) system for use in restaurants, and the like.

BACKGROUND ART

A POS system as related art is described first. This POS system includes a POS terminal, which is provided in each store of a restaurant chain. The store of the chain may use, if the need arises, a portion of a change fund that is in the drawer of the POS terminal at the time to purchase ingredients or consumable supplies of the store that have run out. In this case, the POS system as related art replenishes the spent portion of the change fund through the submission of request paper to the headquarters of a company running that restaurant chain store.

Patent Literature 1 (Japanese Unexamined Patent Application Publication (JP-A) No. 2005-216016) discloses in FIG. 1 a POS system that includes a POS device 10, which is connected to a change dispenser 20, and a store server 1, which is connected to the POS device 10 via a LAN.

Patent Literature 1 also gives a description in Paragraph [0001] in which a POS device connected to a change dispenser automatically records the current amount in the automatic change dispenser for each transaction and transmits the record as a transaction log to a store server.

Patent Literature 2 (Japanese Unexamined Patent Application Publication (JP-A) No. 2007-130331) discloses, in Abstract and FIG. 2, a cash processing machine 10, which calculates the amount of money for buying prizes that remains in a cash cassette 30 detached from a prize buying machine 20, compares the remaining amount with a predetermined prize buying fund for buying special prizes to calculate the deficit or surplus amount of the remaining amount with respect to the prize buying fund, and controls so that the deficit or surplus amount of money is replenished/collected.

CITATION LIST

Patent Literature 1: Japanese Unexamined Patent Application Publication (JP-A) No. 2005-216016
Patent Literature 2: Japanese Unexamined Patent Application Publication (JP-A) No. 2007-130331

DISCLOSURE OF INVENTION

Problem to be Solved by the Invention

As described above, the POS system as related art replenishes the spent portion of the change fund through the submission of request paper to the headquarters. The submission of the request paper involves complicate procedures. There are also cases where people at the store forget to submit the request paper and the change fund becomes short as a result of repeated failure to remember to submit the request paper. The management of cash such as a change fund is thus not clear in the POS system as related art.

An object of this invention is to solve the problem described above and clarify the management of cash such a change fund in a POS system.

A specific object of this invention is to provide a POS system that subtracts the amount of a portion of a change fund that has been spent for other uses than as a change from the total amount of cash gained on a day that the validity of the spending is judged and approved, to thereby calculate the bank deposit amount of the day.

Another specific object of this invention is to provide a terminal for use in a POS system that subtracts the amount of a portion of a change fund that has been spent for other uses than as a change from the total amount of cash gained on a day that the validity of the spending is judged and approved, to thereby calculate the bank deposit amount of the day.

Means to Solve the Problem

According to this invention, there is provided a POS system, including a terminal that includes a bank deposit amount calculating unit for calculating a bank deposit amount for each business day, in which the bank deposit amount calculating unit subtracts an amount spent for other uses than as a change from a total amount of cash gained on a day that validity of the spending is judged and approved, to thereby calculate a bank deposit amount of the day.

According to this invention, there is also provided a terminal for use in a POS system, including a bank deposit amount calculating unit for calculating a bank deposit amount for each business day, in which the bank deposit amount calculating unit subtracts an amount spent for other uses than as a change from a total amount of cash gained on a day that validity of the spending is judged and approved, to thereby calculate a bank deposit amount of the day.

Effect of the Invention

According to this invention, the POS system subtracts the amount of the portion of the change fund that has been spent for other uses than as the change from the total amount of cash gained on the day that the validity of the spending is judged and approved, to thereby calculate the bank deposit amount of the day. Therefore, the portion of the change fund that has been spent for other uses than as the change can be replenished on the day that the validity of the spending is judged and approved from the cash gained on the day, and a situation where the change fund falls short the next day can be avoided. In addition, this invention makes cash management clear in the POS system.

EMBODIMENTS FOR CARRYING OUT THE INVENTION

An embodiment of this invention is now described in detail.

Figure 1:
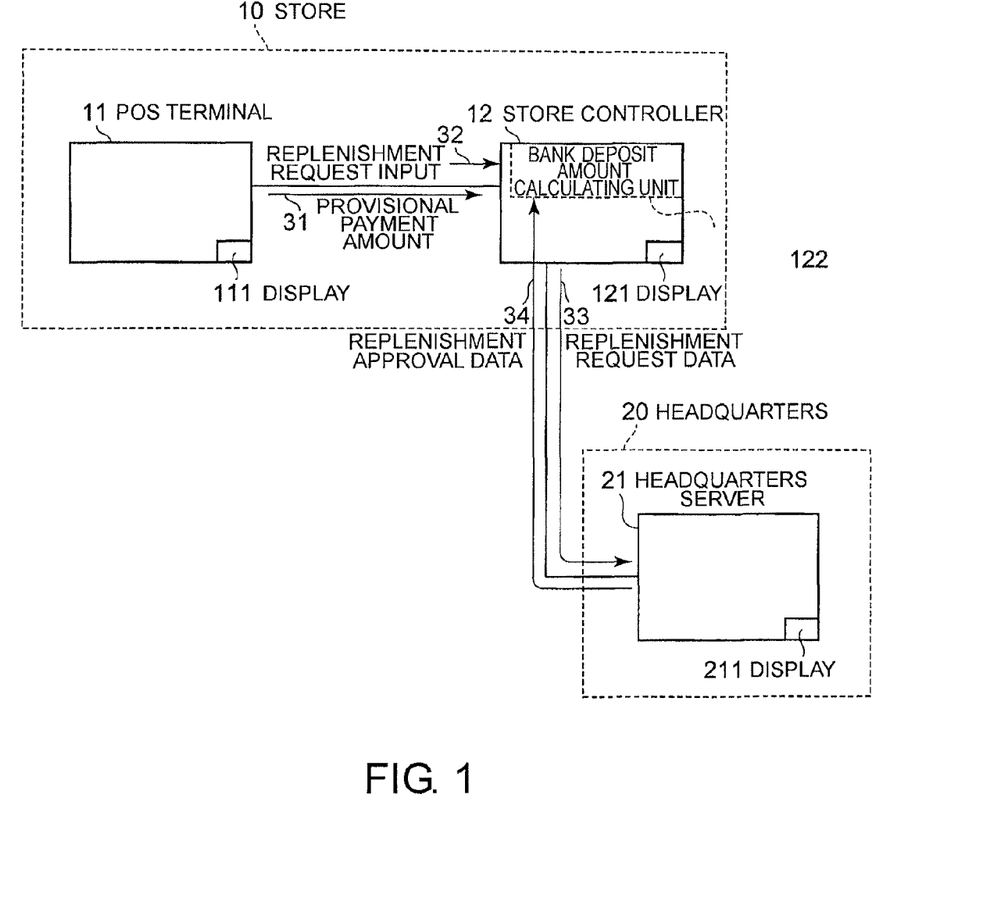
FIG. 1 is a block diagram of a POS system according to a first embodiment of this invention.

FIG. 1 illustrates a POS system according to a first embodiment of this invention. The POS system according to the first embodiment includes a POS terminal 11 and a store controller 12, which are provided in a store 10 of a restaurant chain, and a headquarters server 21, which is provided in a headquarters 20 of a company running the restaurant chain store. The configuration of FIG. 1 is a minimum configuration, and a plurality of POS terminals and a plurality of store controllers of a plurality of stores may be connected to the headquarters server 21.

The POS terminal 11 is a computer terminal that includes input/output means such as a display 111, a keyboard (not shown), and a receipt issuing printer (not shown) to execute the settlement of a food and drink bill, namely, sales processing and the like. The store controller 12 is a control terminal that includes input/output means such as a display 121 and a keyboard (not shown) to handle a request for the replenishment of a portion of a change fund, cash management in the store 10, and the like.

The POS terminal 11 and the store controller 12, which are connected by a communication line, are set up in the store 10. The connection between the POS terminal 11 and the store controller 12 may be wireless.

The headquarters server 21 is a computer terminal that includes input/output means such as a display 211 and a keyboard (not shown) to receive a request for the replenishment of a portion of a change fund and process the request for the replenishment.

The headquarters server 21 is connected to the store controller 12 by a communication line and is set up in the headquarters 20.

A description is given below on how the POS system of FIG. 1 operates in the restaurant chain store when a portion of a change fund that is in a drawer of the POS terminal 11 at the time is used to purchase ingredients or consumable supplies of the store 10 that have run out.

Described first is a request for the replenishment of the portion of the change fund spent to purchase ingredients or consumable supplies of the store 10 that have run out (hereinafter referred to as "replenishment request" or "shopping money request").

Figure 2A:
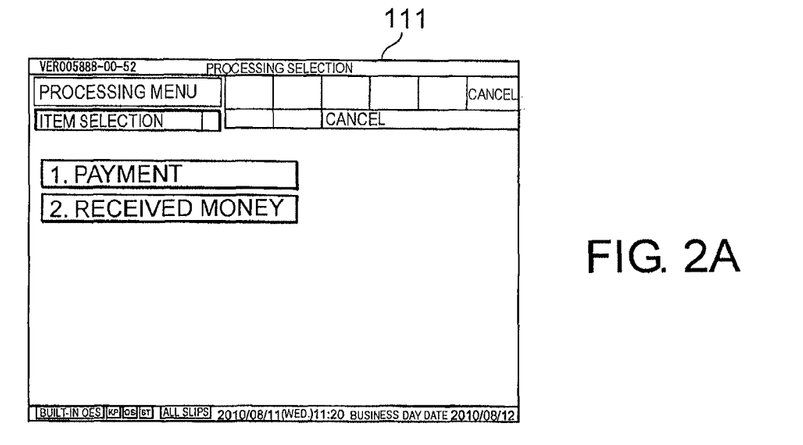
FIG. 2A is a diagram of one display screen of a POS terminal display which illustrates the operation of a POS terminal in the POS system of FIG. 1.
Figure 2B:
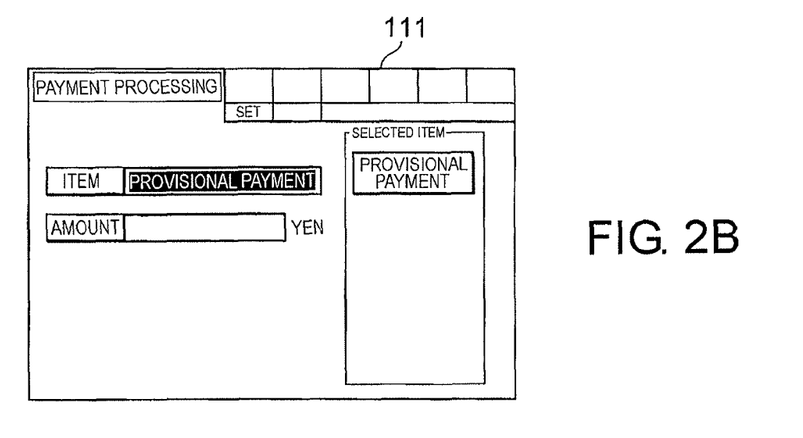
FIG. 2B is a diagram of another display screen of the POS terminal display which illustrates the operation of the POS terminal in the POS system of FIG. 1.
Figure 2C:
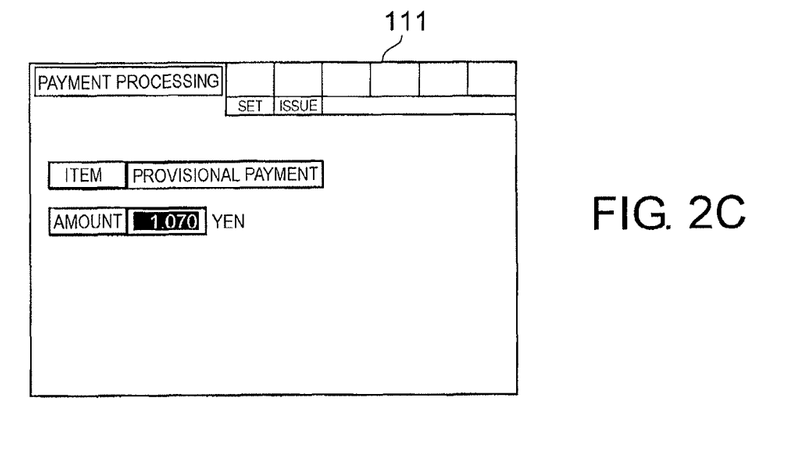
FIG. 2C is a diagram of still another display screen of the POS terminal display which illustrates the operation of the POS terminal in the POS system of FIG. 1.

To make a replenishment request (shopping money request) in FIG. 1, an employee operates the POS terminal 11 to display a processing menu selection screen (FIG. 2A) on the display 111, selects "payment" on the processing menu selection screen, then selects "provisional payment" (FIG. 2B), and enters an amount (FIG. 2C). The POS terminal 11 transmits this data (provisional payment amount) 31 to the store controller 12. The store controller 12 receives the provisional payment amount 31 and stores as "payment".

Figure 3:
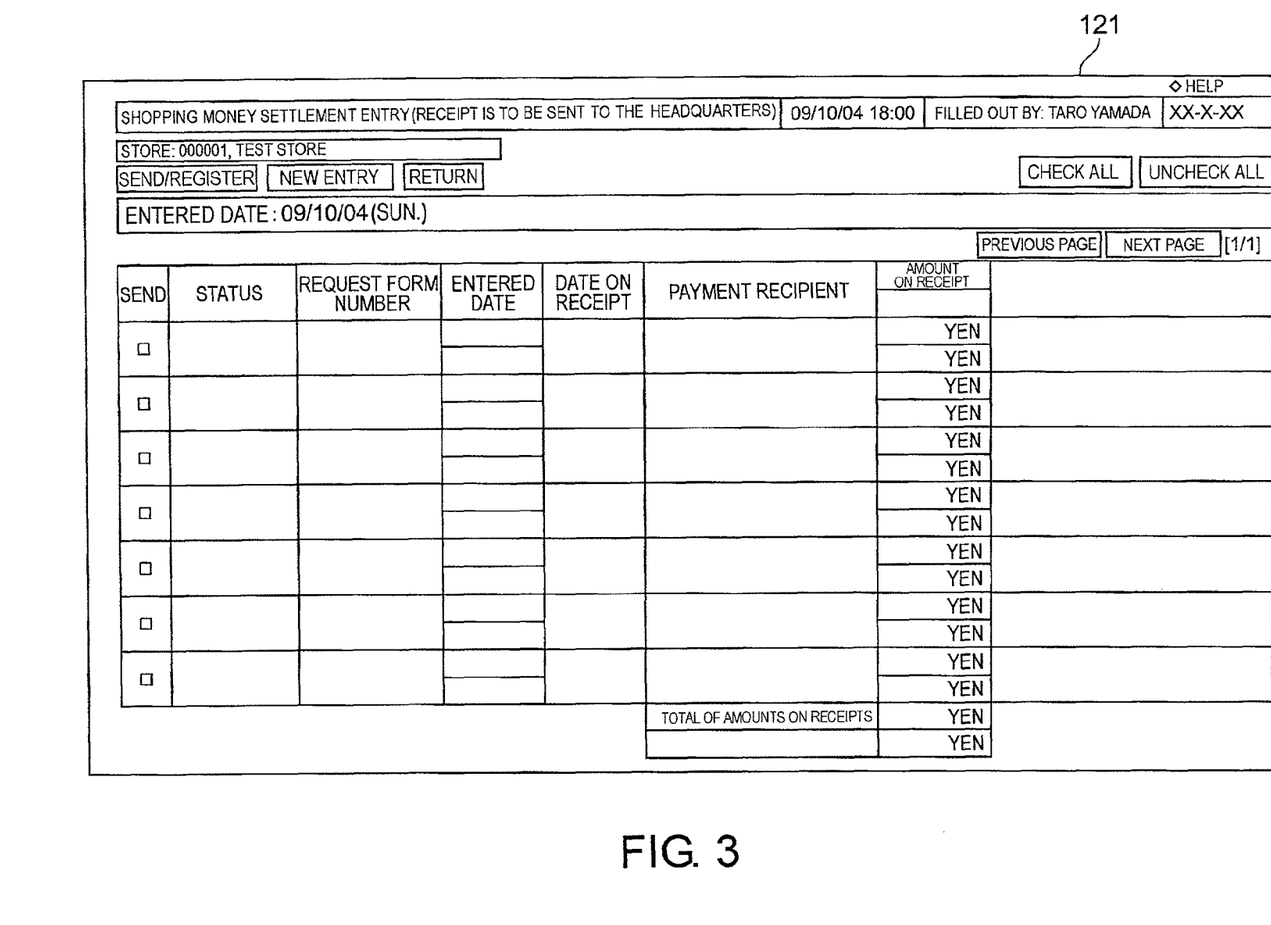
FIG. 3 is a diagram of a display screen of a store controller display which illustrates a store controller operation in the POS system of FIG. 1.

The employee subsequently performs replenishment request input (shopping money request input) 32 via the store controller 12 in FIG. 1. Specifically, the employee operates the store controller 12 to display a shopping money settlement entry screen (FIG. 3) on the display 121, enters his/her full name (the name may be entered by the scanning of an ID card, for example) on the shopping money settlement entry screen, and selects "new entry". By selecting "new entry", a shopping money settlement entry screen of FIG. 4 is displayed.

Figure 4:
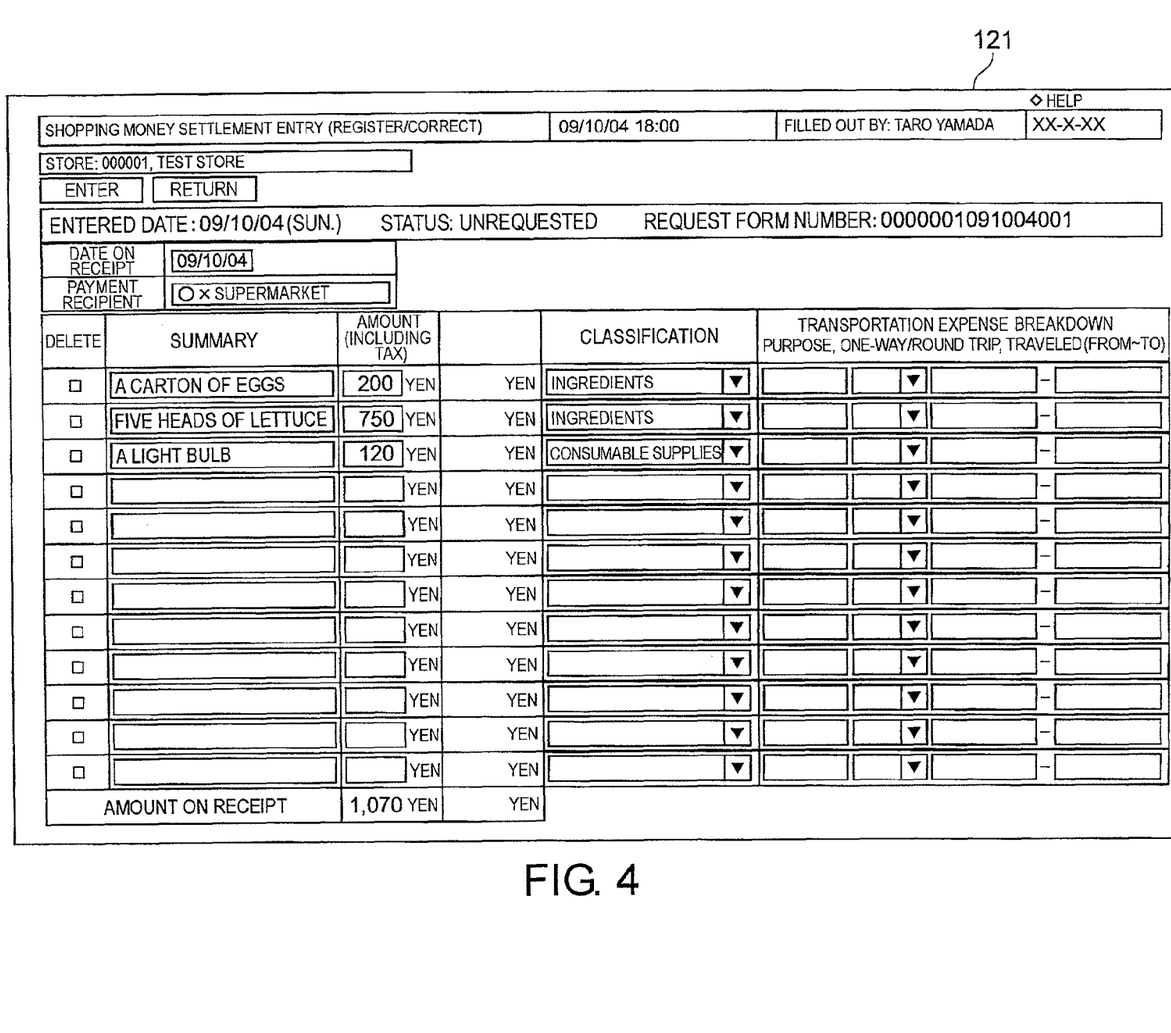
FIG. 4 is a diagram of a display screen of the store controller display which illustrates another store controller operation in the POS system of FIG. 1.
Figure 5:
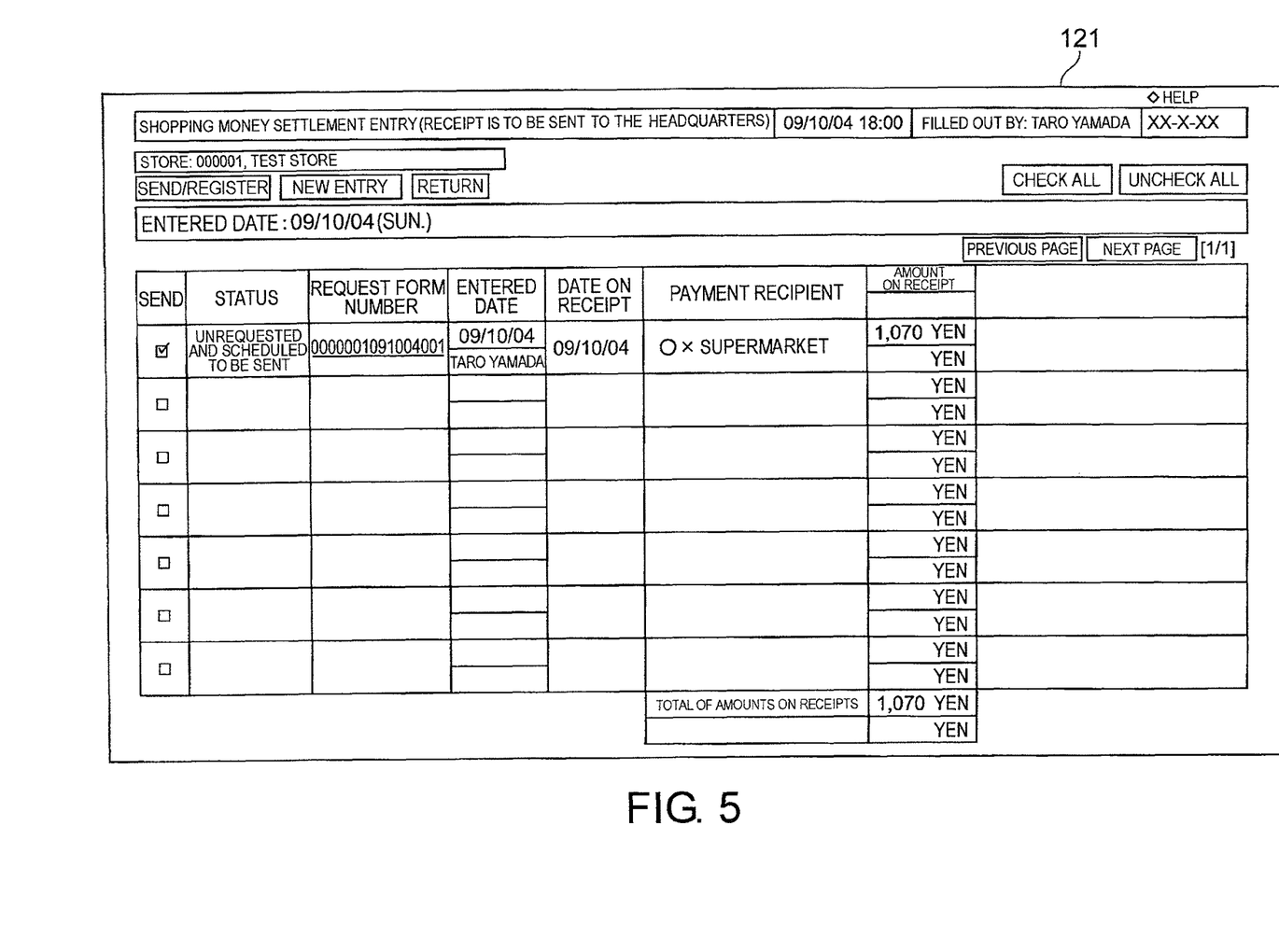
FIG. 5 is a diagram of a display screen of the store controller display which illustrates still another store controller operation in the POS system of FIG. 1.

The employee operates the store controller 12 to enter a receipt date, a payment recipient, a summary (particulars), an amount, and a classification on the shopping money settlement entry screen as illustrated in FIG. 4 and, after finishing entering, selects "enter". The screen may be designed so that entering a classification is not necessary. Selecting "enter" causes the store controller 12 to compare the total amount (the amount on the receipt) among the input data with the provisional payment amount received from the POS terminal 11. When the two match, the store controller 12 displays a shopping money settlement entry screen of FIG. 5. The employee operates the store controller 12 to check a "send" checkbox on the displayed shopping money settlement entry screen as illustrated in FIG. 5, thereby issuing a "send" instruction. The input data and a request form number assigned to the input data are transmitted to the headquarters server 21 as shopping money request data (replenishment request data) 33.

In the case where "enter" is selected on the shopping money settlement entry screen of FIG. 4 as described above and it is revealed as a result of comparison that the total amount (the amount on the receipt) among the input data does not match the provisional payment amount received from the POS terminal 11, the store controller 12 displays a message to the effect that the amount on the receipt does not match the provisional payment amount, instead of displaying the shopping money settlement entry screen of FIG. 5, to thereby prompt the employee to correct the data. The employee operates the store controller 12 to correct the data input on the shopping money settlement entry screen of FIG. 4 and, after finishing correcting, selects "enter". Upon selection of "enter", the store controller 12 operates the same way that is described above.

FIG. 5 illustrates the screen immediately before the transmission, and after the transmission, "status" changes from "unrequested/scheduled to be sent" to "transmitted".

To make the replenishment request (shopping money request) from the store controller 12 to the headquarters server 21 in FIG. 1, the store controller 12 transmits the shopping money request data (replenishment request data) 33 to the headquarters server 21 in the manner described above and, a receipt that is the basis of the replenishment request (shopping money request) is also sent to the headquarters 20 by postal mail, FAX, or the like. Alternatively, the store controller may be provided with means for capturing an image of a receipt so that a captured image of a receipt is transmitted as electronic data along with the shopping money request data (replenishment request data) 33 when a replenishment request (shopping money request) is made.

In the case where a portion of the change fund is used as an ad hoc transportation expense of an employee, the breakdown of the transportation expense is entered in a right field on the shopping money settlement entry screen of FIG. 4 to make a replenishment request (shopping money request) in the manner described above.

Shopping money approval (replenishment approval) on the headquarters server 21 is described next.

Figure 6:
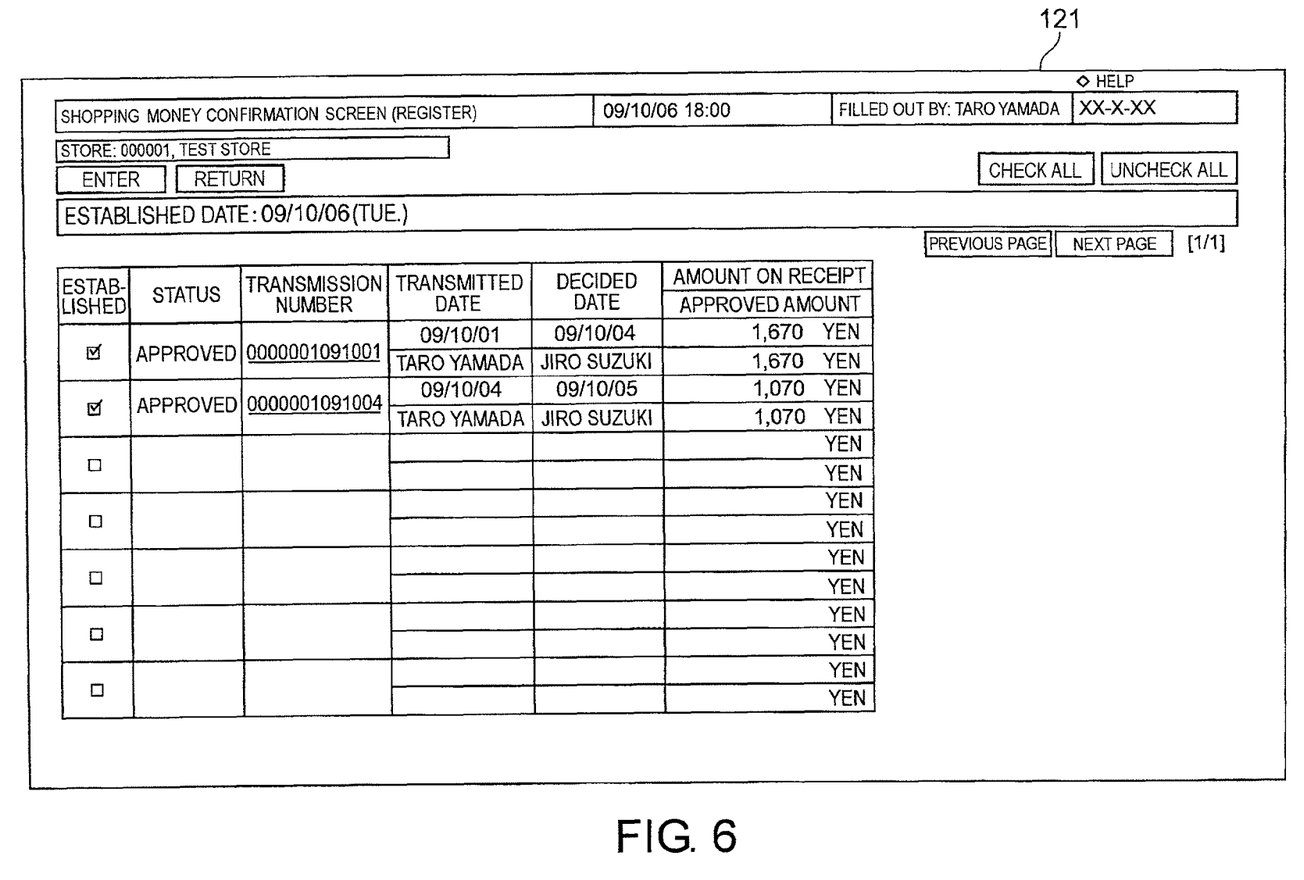
FIG. 6 is a diagram of a display screen of the store controller display which illustrates yet still another store controller operation in the POS system of FIG. 1.

In FIG. 1, a person who makes the decision on the matter operates the headquarters server 21 to enter his/her full name (the name may be entered by the scanning of an ID card, for example) as an authorizer, determines whether the spending of the portion of the change fund is valid based on the transmitted shopping money request data (replenishment request data) 33 and a receipt that has been sent separately from the data, and, when the spending is valid, gives approval on the shopping money ("shopping money approval (replenishment approval)"). After the approval is entered, the authorizer operates the headquarters server 21 to transmit, to the store controller 12, as approved data, replenishment approval data 34 which indicates that the replenishment has been approved. FIG. 6 illustrates the approved data (replenishment approval data) 34 transmitted from the headquarters server 21 to the store controller 12. It goes without saying that the store 10 makes a replenishment request (shopping money request) only when a portion of the change fund is spent for a valid use.

The confirmation of shopping money approval (replenishment approval) on the store controller 12 is described next.

The store controller 12 in FIG. 1 receives the approved data (replenishment approval data) 34 (FIG. 6) from the headquarters server 21, and displays the received approved data (replenishment approval data) 34 on the display 121. An employee at the store 10 reviews the approved data (replenishment approval data) 34 displayed on the display 121 of the store controller 12, and checks an "established" checkbox as illustrated in FIG. 6 to register the entry. An amount with which the change fund is replenished is thus established on the store controller 12. The employee can review details of the replenishment approval data 34 by clicking a "transmission number" in the replenishment approval data 34 (FIG. 6) displayed by the store controller 12 on the display 121.

Described next is how a portion of the change fund that has been used as shopping money (a portion that has been spent for other uses than as a change) is replenished.

A portion of the change fund that has been used as shopping money (a portion that has been spent for other uses than as a change) is replenished by:

1) performing, by a bank deposit amount calculating unit 122 of the store controller 12, a calculation in which the portion of the change fund that has been used as shopping money (a portion that has been spent for other uses than as a change) is subtracted from the total amount of cash gained, such as a cash sale, on a day that the validity of the spending is judged and approved, and the calculated amount is set as a bank deposit amount of the day; and 2) taking money equivalent to the bank deposit amount out of the drawer of the POS terminal 11, depositing the money in a bank, and setting money that remains in the drawer of the POS terminal 11 as a change fund for the next business day.

The operation of the bank deposit amount calculating unit 122 (in particular, the bank deposit amount calculation described above) of the store controller 12 is described below.

In FIG. 1, the bank deposit amount calculating unit 122 of the store controller 12 receives the sale of the day and other types of data from the POS terminal 11 after the store closes on every business day, calculates a bank deposit amount expressed by Expression (1), which is described later, based on the sale of the day and the like, and displays the calculated bank deposit amount on the display 121. An employee takes the amount displayed on the display 121 out of the drawer of the POS terminal 11 and deposits the amount in a bank. Money remaining in the drawer of the POS terminal 11 serves as a change fund for the next business day.

Basically, if A yen is registered as a change fund stored in the drawer of the POS terminal 11 and the sale of the day is B yen, B yen is the bank deposit amount and is deposited in a bank. A yen remains as a change fund in the drawer of the POS terminal 11 in the case where a portion of the change fund has not been spent for shopping money. If a portion of the change fund, X yen, is used as shopping money at this point, a change fund for the next business day is (A−X) yen.

Figure 7:
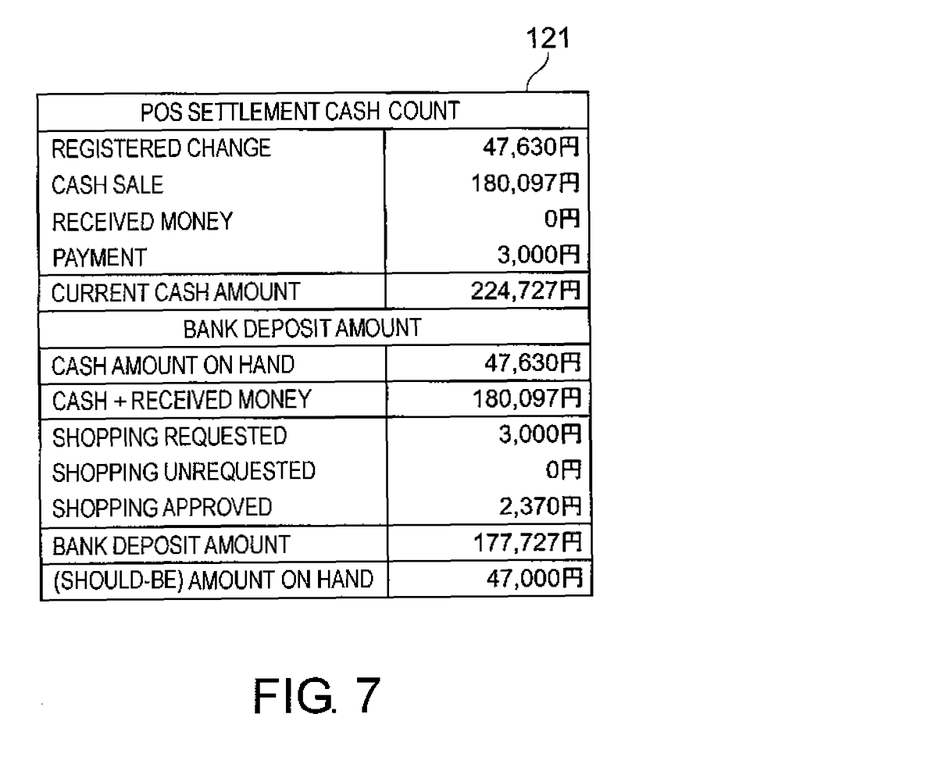
FIG. 7 is a diagram of a display screen of the store controller display which illustrates yet still another store controller operation in the POS system of FIG. 1.

A concrete example is described with reference to FIG. 7. FIG. 7 is a screen that is displayed on the display 121 of the store controller 12 after the store is closed for the day on one business day and the bank deposit amount calculating unit 122 of the store controller 12 finishes calculating the bank deposit amount.

In FIG. 7, a "POS settlement cash count" field shows the amount of a change fund for the day in question, the amount of the cash sale of the day, and others.

"Registered change" indicates the amount of money that is in the drawer before the POS terminal 11 executes any type of processing on the day (a change fund of the day). On the first day of the business, the amount of money to be stored in the drawer as a change fund is registered. The amount of money stored in the drawer as a change fund is therefore the amount of "registered change" at this point.

"Cash sale" indicates the total sale of the day in cash. (Although the POS system also handles settlement by credit cards and the like, it is not directly relevant to this invention and the example therefore sticks to sales in cash.) The "cash sale" data is transmitted from the POS terminal 11 on every business day at the time the store closes.

"Received money" indicates the amount of money put by customers on the day in question into a collection box that is set up near the POS terminal 11 for a charity purpose. In FIG. 1, an employee operates the POS terminal 11 to display the processing menu selection screen (FIG. 2A) on the display 111, and selects "received money" on the processing menu selection screen to enter the amount of the money donated before calculating the bank deposit amount. The amount of "received money" in this example is 0 yen.

"Payment" indicates an amount used as shopping money or the like on the day in question.

"Current cash amount" indicates an amount calculated by the following calculation (the amount of money stored in the drawer of the POS terminal 11 at the time the store is closed).

"current cash amount"="registered change"+"cash sale"+"received money"−"payment"

A "bank deposit amount" field shows an amount to be deposited in a bank and others.

"Cash amount on hand" is the same as "registered change".

"Cash+received money" is the amount of an addition "cash sale"+"received money".

"Shopping requested" is an amount for which a shopping money request has been made on the day and which has not been approved yet.

"Shopping unrequested" is an amount for which a shopping money request has not been made. The amount of "shopping unrequested" in this example is 0 yen.

"Shopping approved" is an amount that has been approved by the previous day as shopping money and has finished confirmation processing on the day in question. Approval can also be given on a day that a shopping money request is made.

"Bank deposit amount" indicates an amount to be deposited in a bank, and is calculated by the following calculation.

"bank deposit amount"="cash+received amount"− "shopping approved" (1)

"(Should-be) amount on hand" is an amount remaining in the drawer after the amount of money to be deposited in a bank is taken out of the drawer (the remaining amount serves as a change fund for the next business day), and is calculated by the following calculation.

"(should-be) amount on hand"=("cash amount on hand"+"cash+received money")−"shopping requested"−"shopping unrequested"−"bank deposit amount"

As has been described, in the POS system according to the first embodiment of this invention, the bank deposit amount calculating unit 122 of the store controller 12 subtracts the amount of a portion of a change fund that has been spent for other uses than as a change from the total amount of cash gained on a day that the validity of the spending is judged and approved, to thereby calculate the bank deposit amount of the day. Therefore, a portion of a change fund that has been spent for other uses than as a change can be replenished on a day that the validity of the spending is judged and approved from cash gained on the day, and a situation where the change fund falls short the next day can be avoided. In addition, the first embodiment makes cash management clear in the POS system.

The invention of the subject application has now been described in detail through an embodiment. However, the invention of the subject application is not limited to the embodiment described above. Various modifications comprehensible to the skilled in the art can be made to the configuration and details of the invention of the subject application within the scope of the invention of the subject application.

This application claims priority based on Japanese Patent Application No. 2011-018619, filed on Jan. 31, 2011, the entire disclosure of which is incorporated herein by reference.

REFERENCE SIGNS LIST 10 store
11 POS terminal
111 display
12 store controller
121 display
122 bank deposit amount calculating unit
20 headquarters
21 headquarters server
211 display
31 provisional payment amount
32 replenishment request input
33 replenishment request data
34 replenishment approval data

The invention claimed is:

1. A POS system, comprising a terminal that comprises a bank deposit amount calculating unit for calculating a bank deposit amount for each business day,
    wherein the bank deposit amount calculating unit subtracts an amount spent for other uses than as change from a total amount of cash gained on a day for which validity of spending is judged and approved, to thereby calculate a bank deposit amount of the day,
    wherein the amount spent for other uses than as change is a portion of change fund that has been spent for other uses than as change,
    wherein the total amount of cash gained on the day comprises a total cash sale of the day,
    wherein the POS system comprises a POS terminal, which is provided in a store, a store controller, which is provided in the store to work as the terminal that comprises the bank deposit amount calculating unit, and a headquarters server, which is provided in a headquarters of the store,
    wherein, when a portion of change fund in a drawer of the POS terminal has been spent for other uses than as change at the store, the store controller transmits, to the headquarters server, replenishment request data for requesting for replenishment of the portion of the change fund that has been spent for other uses than as change,
    wherein the headquarters server receives the replenishment request data, determines the validity of the spending of the portion of the change fund that has been spent for other uses than as change based on the received replenishment request data, and, when the spending is valid, transmits, to the store controller, replenishment approval data which indicates that the replenishment has been approved, and
    wherein the bank deposit amount calculating unit of the store controller calculates a bank deposit amount of the day by subtracting an amount spent for other uses than as a change from a total amount of cash gained on a day that the replenishment approval data was received with the store controller, under the condition that the day in which the replenishment approval data was received with the store controller is the day that the validity of the spending was approved.

2. A POS system according to claim 1, wherein the POS terminal and the store controller are provided in the same store, and the headquarters server is provided in a headquarters of a company running the store.

* * * * *